Dec. 29, 1953   A. J. KAVANAGH   2,664,026
REFLECTING TYPE IMAGE FORMING LENS SYSTEM
Filed Nov. 3, 1949   3 Sheets-Sheet 1

INVENTOR
ARTHUR J. KAVANAGH
BY
ATTORNEYS

INVENTOR
ARTHUR J. KAVANAGH
ATTORNEYS

Dec. 29, 1953  A. J. KAVANAGH  2,664,026
REFLECTING TYPE IMAGE FORMING LENS SYSTEM
Filed Nov. 3, 1949  3 Sheets-Sheet 3
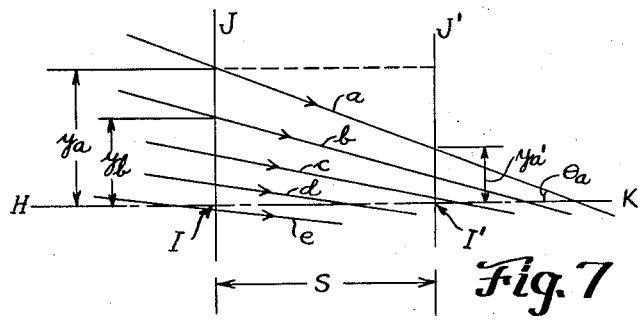
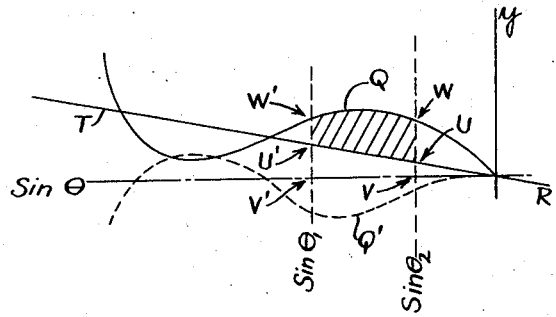
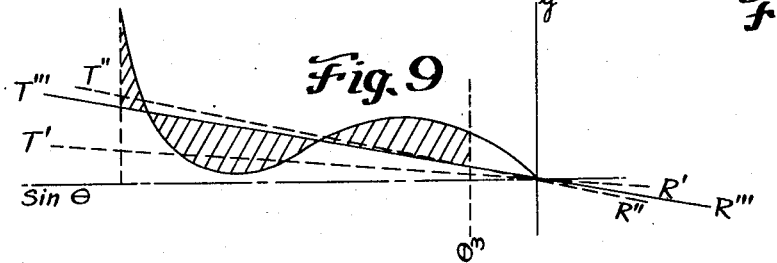
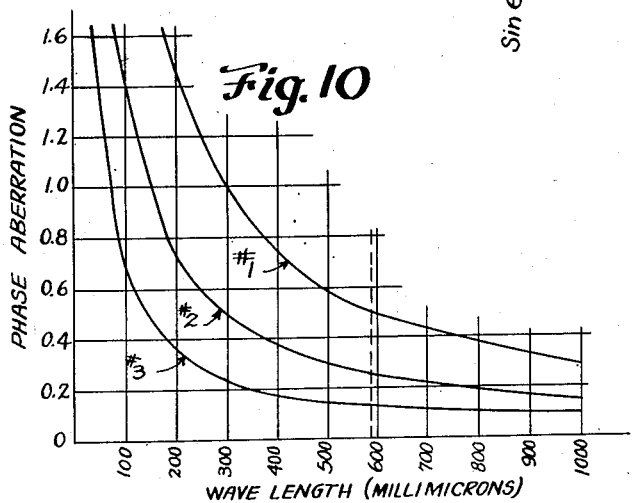
INVENTOR
ARTHUR J. KAVANAGH
BY
ATTORNEYS Patented Dec. 29, 1953

2,664,026

UNITED STATES PATENT OFFICE 2,664,026

REFLECTING TYPE IMAGE FORMING LENS SYSTEM

Arthur J. Kavanagh, Darien, Conn., assignor to American Optical Company, Southbridge, Mass., a voluntary association of Massachusetts Application November 3, 1949, Serial No. 125,180

6 Claims. (Cl. 88—57)

This invention relates to a reflecting type image-forming optical system and may be employed in a photographic, projection, or microscope objective or the like.

More particularly the invention relates to such a system employing at least two reflecting elements having spherically curved and optically aligned reflecting surfaces with their respective radii located at, or substantially at, a common center and with the radii of such lengths with respect to each other that the image-forming system will provide an image of predetermined magnification, will have a relatively high numerical aperture, will be well corrected for spherical aberration as well as free from chromatic aberration, coma, astigmatism and distortion, and when used as a microscope objective will have a relatively long working distance.

In certain fields of optics such as microscopy, it is often highly desirable to employ image-forming optical systems of the reflecting type, instead of systems of the more conventional refracting type. For example, when biological research or the like is being carried on while using ultra-violet illumination a reflecting type system might be far more useful since certain well known forms of optical glass used in refracting lens systems are opaque or nearly opaque to such radiations even though they are highly transparent to most radiation in the visible region of the spectrum. Reflecting systems are additionally highly advantageous for infra-red microscopy and the like. Furthermore, when only specularly reflecting surfaces are employed in such a system a material advantage is obtained since chromatic aberration is completely excluded.

A number of different types of reflecting image-forming optical systems using one or more spherical surfaces have been constructed heretofore. However, where numerical apertures of appreciable sizes were desired spherical aberration, astigmatism, coma and distortion have been so objectionable that aspherically curved surfaces have been substituted in attempts to obtain acceptable results. Optical elements having good aspherically corrected reflecting surfaces are very difficult and expensive to make and thus reflecting systems employing such elements are not commonly employed.

It has been found, however, that an image-forming system employing two spherically curved and optically aligned surfaces can be produced and co-related in accordance with the teachings of the present invention so as to provide a system well corrected for spherical aberration while having a relatively high numerical aperture. Since the system is purposely constructed and arranged so that the two reflecting elements have their respective centers at, or substantially at, a common point and since the plane of the aperture stop passes through this point, coma, astigmatism and distortion are eliminated. Of course when only reflecting surfaces are used, chromatic aberration is avoided. The construction and arrangement of the parts of the system are such that the inherent or residual spherical aberrations of the individual reflecting elements are carefully balanced against each other so that numerical apertures of relatively high values may be used while maintaining the spherical aberration and curvature of field of the system within very small but acceptable limits.

The present invention, accordingly, has for its primary object the provision of an image-forming optical system of the reflecting type which employs a pair of co-related spherically curved reflecting elements of such predetermined radii extending from, or substantially from, a common center that a predetermined magnification will be provided while allowing the use of a numerical aperture of relatively high value and providing an image well corrected for spherical aberration. The invention also includes a method of producing such a system.

Other objects and advantages of the invention and a better understanding thereof may be had from the detailed description which follows when taken in conjunction with the accompanying drawing in which:

Fig. 7 is a sketch which is used in explaining the determination of relative spherical aberrations at axially spaced image planes;

Fig. 8 is a lateral intersection graph;

Fig. 9 is another lateral intersection graph; and

Fig. 10 is a phase aberration graph.

Figure 1:
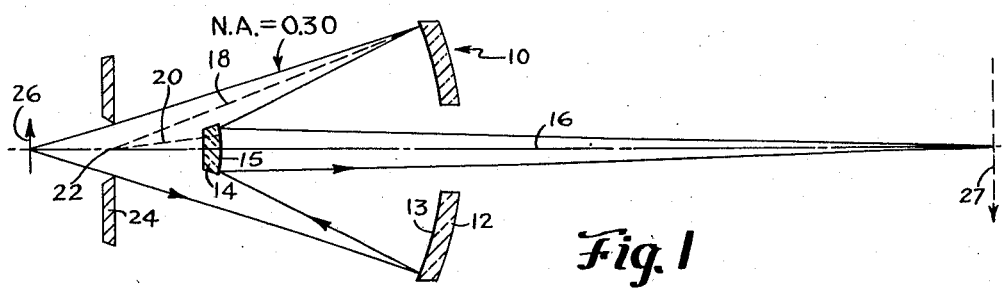
Fig. 1 is a diagrammatic showing of a microscope objective embodying the invention.

Referring to the drawings in detail. Fig. 1 shows diagrammatically a microscope objective 10 comprising a first reflecting element 12 having a concave spherically curved surface 13 and a second reflecting element 14 having a convex spherically curved surface 15. These two reflecting elements have the vertices of their curved surfaces so disposed in spaced relation along an optical axis 16 that their respective radii 18 and 20 radiate from a common center or axial point 22 (or substantially from such a common center when used with other optical elements as will be more fully explained hereinafter). An aperture diaphragm 24 is provided preferably in the transverse plane passing through the axial center 22 and the size of the clear aperture therein governs the light gathering capacity or numerical aperture of the system. The system of Fig. 1 is shown focused upon an object plane 26 and the light rays therefrom are brought to focus by the system upon an image plane 27 which is conjugate thereto.

Figure 2:
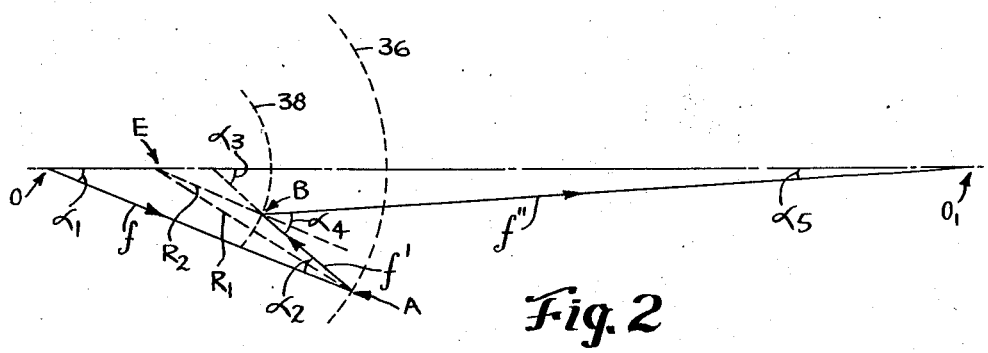
Fig. 2 is a sketch which may be useful in gaining an understanding of the invention.

If reference is made to Fig. 2, wherein a pair of axially aligned spherical surfaces 36 and 38 having a common center E are diagrammatically indicated, it will be seen that these surfaces may be arranged so that a ray of light $f$ traveling (in the plane of the paper) from an axial object point O to an axial image point $O_1$ will first strike the primary reflecting surface 36 at a point A and will be reflected thereby in the direction $f'$ toward the second reflecting surface 38, will strike this surface at a point B and will be reflected thereby in a direction $f''$ toward the image point $O_1$. The radius of the first surface extending from the point A may be indicated as $R_1$ and the radius of the second surface extending from the point B may be indicated as $R_2$.

The angular relation between the ray $f$ and the optical axis $O$—$O_1$ in the object space may be represented by the angle $a_1$ while the angular relation between the portions of the ray before and after the first reflection can be expressed by the angle $a_2$. The angular relation between the portion of the ray after the first reflection and the optical axis can be represented by the angle $a_3$, the angular relation between the portions of the ray before and after the second reflection expressed by $a_4$, and the angular relation between the ray after the second reflection and the optical axis in the image space expressed by the angle $a_5$.

If we are to assume that the ray $f$ being considered in Fig. 2 is one which is at all times indefinitely close to the optical axis as it travels from O to O', we may proceed under the theory of Gaussian imagery (see pages 367, etc., Principles and Methods of Geometrical Optics, by J. P. C. Southall, the Macmillan Company, N. Y., 1910). Of course under such conditions the angles $a_1$, $a_2$, $a_3$, $a_4$ and $a_5$ will all be too small for any practical purposes. However, for immediate purposes, the sine of each angle can be considered to be equal to the numerical value thereof.

Under such conditions if we are to let the magnification which the system is to produce for a given pair of conjugate planes be represented by the letter M, and let the distance from the object plane point O to the common center E (which as will appear later may be considered approximately equal to the working distance for the system) equal one unit of measure of a preselected axial distance between the conjugate planes of the system, and let the optical angle (angle times index of refraction of the medium of prorogation) of the ray $f$ in the object space equal 1, then the optical angle of the ray in the image space will equal $$\frac{1}{M}$$

It can then be readily shown by algebraic manipulations that the radii $R_1$ and $R_2$ of the reflecting surfaces can be expressed in terms of magnification and the angle $a_3$ which defines the directions of the ray between the first and second reflections.

Equations for $R_1$ and $R_2$ are as follows:

$$R_1 = \frac{2}{a_3+1} \qquad \text{Eq. (1)}$$

$$R_2 = \frac{2M}{1+Ma_3} \qquad \text{Eq. (2)}$$

(In considering the diagram of Fig. 2 the sign of each radius is positive if the vertex of the associated surface precedes the center of curvature thereof along the optical axis in the direction of prorogation of the light.)

Thus it will be seen that values for $R_1$ and $R_2$ for producing a monocentric reflecting system of any preselected magnification can be obtained for any given pair of conjugate planes and such will be directly dependent upon the angular value $a_3$ of the portion $f'$ of the ray between the two reflecting surfaces.

Thus if we are to employ a well-known formula for the Seidel or third-order spherical aberration (such as that found on page 336 of Mathematical Theory of Optics, by R. K. Luneburg, Brown University Press, Providence, R. I.) and substitute into same the values of $R_1$ and $R_2$ given by the above equations, we may obtain the following equation:

$$A' = \frac{M-1}{8M^3}[M^2 a_3^2 + M(M+1)a_3 - (M^2+M+1)]$$

Eq. (3)

wherein A' represents the value of the third-order spherical aberration for the system and may, in this instance, be assigned a numerical value of zero.

In such a case it is necessary (except for the relatively unimportant case where the value of M is equal to 1) that the following aggregation taken from Equation 3 be set equal to zero:

$$M^2 a_3^2 + M(M+1)a_3 - (M^2+M+1) = 0 \quad \text{Eq.(4)}$$

This new equation will give two real roots for the angle $a_3$ for all real values assumed for the magnification M. Hence, for any chosen magnification there will be two separate monocentric systems which will have zero third-order spherical aberration and the specifications for any such system can be obtained by substituting the corresponding obtained value of $a_3$ into Equations 1 and 2 for the radii $R_1$ and $R_2$.

For example, if it is assumed that a microscope objective is to have a 10X magnification, we may let $M = -10$ and by substituting this value into Equation 4 obtain:

$$100a_3^2 + 90a_3 - 91 = 0$$

Hence $a_3$ will be equal to $-1.50475$ or $0.60475$.

By using the positive root in the Equations 1 and 2 we will find that $R_1=1.24630$ and $R_2=3.96236$.

From the fact that both of these radii are positive and greater than unity and from the sign convention previously given, it is evident that the vertices of both spherical surfaces must lie to the left of the object point O in Fig. 2. If a microscope objective were being figured to these specifications it would mean that both surfaces would have to lie below the plane of the stage, but such a condition would not be practical.

On the other hand, if the negative root values are used it will be seen that they will give $$R_1 = -3.96236$$
$$R_2 = -1.24630$$

In this case both of the reflecting surfaces will be to the right of the object point O, and thus suitably arranged for use as a microscope. For a standard 10X microscope objective a desirable distance from the object 26 to the common center 22 in Fig. 1 is about 16.607 mm. and since the values of $R_1$ and $R_2$ have been determined on the basis of the distance E to O in Fig. 2 as unity, for such an objective the lengths of the two radii will accordingly be:

$$R_1 = -65.803 \text{ mm.}$$
$$R_2 = -20.697 \text{ mm.}$$

Figure 3:
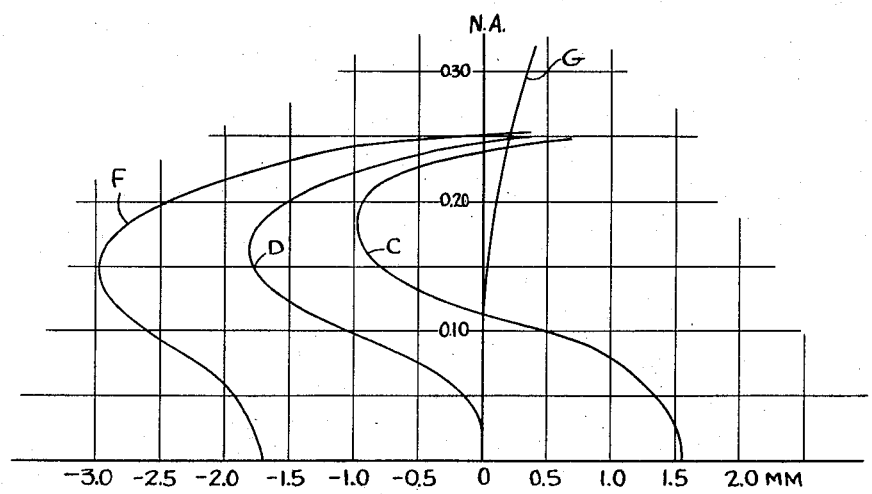
Fig. 3 is a longitudinal spherical aberration graph showing characteristics of a reflecting objective employing the invention as well as those of a conventional well-corrected refracting objective.

In Figure 3 of the drawing is shown a spherical aberration graph which indicates in millimeters in the horizontal direction thereof longitudinal spherical aberration and in the vertical direction the numerical aperture (N. A.). Upon this graph appears a curve G which represents the departure from zero of the spherical aberration for the above 10X reflecting objective for the different values of numerical apertures up to approximately N. A. 0.30. Since only reflecting surfaces are used in this objective, no refraction of light takes place and thus no color aberrations are present. In other words, a single curve is fully representative of the spherical aberrations of the objective. For comparison purposes, however, there are also given three curves marked C, D and F which show the departures from zero spherical aberration for a standard commercial 10X achromatically corrected refracting type objective for each of the three wave lengths of light denoted by the Fraunhofer letters C, D and F. These three curves represent a numerical aperture up to approximately N. A. 0.25. It will be readily appreciated that the reflecting objective is markedly better up to N. A. 0.30 than the refracting objective up to N. A. 0.25 and that considerable chromatic aberration is present in the latter type objective even at a lesser aperture.

The spherical aberration for this 10X microscope reflecting objective was considered within acceptable limits when individual exact rays were traced or triangulated through the system and the exacting Rayleigh phase aberration criterion limits of $\frac{1}{4}$ wavelength were applied. This criterion requires that the difference between the longest and the shortest optical paths leading from the object point to the image point shall not exceed $\frac{1}{4}\lambda$. While the above manner has been found convenient, other criteria could obviously be used for evaluating the spherical aberration correction for the system, if desired. Furthermore, the Rayleigh criterion limits for military instruments and the like may be taken at $\frac{1}{2}$ wavelength instead of $\frac{1}{4}\lambda$ maximum departure from the mean wave front, and may be considered to be within acceptable limits.

In many cases, such as when a system with a very high N. A. and high correction is desired, or when a high magnification is desired, or a cover plate of known characteristics is to be used with a specimen or even when a compensating spherical aberration is desirable in the system so as to function better in combination with some other optical system (for example, a refracting eye lens) it may be desirable to improve the spherical aberration correction for the reflecting system or to even introduce controlled amounts of spherical aberration to produce a finished system either over corrected or under corrected in a predetermined manner as desired. This controlled balance of the spherical aberration of the system may be obtained, it has been found, by introducing into Equation 3 a small amount of third-order spherical aberration either of a positive or negative value as needed. This small amount may be determined by trial and error and the resulting value of $a_3$ tested. In other words, A′ may be allowed to equal some small arbitrary value and the equation solved for new values of $a_3$ after which the radii of the reflecting surfaces of the new system may be obtained and investigated by exact ray tracing to determine the characteristics thereof.

Figure 4:
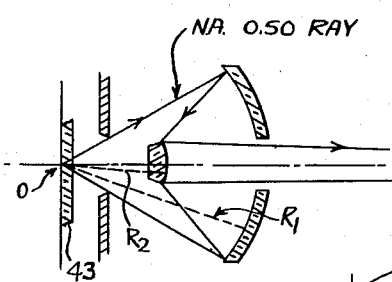
Fig. 4 is a diagrammatic showing of another microscope objective of higher numerical aperture and corrected for use with a cover plate.

For example, when A′ of Equation 3 was assumed to be equal to a value of zero and Equation 4 solved for values of $a_3$ using a magnification of $M = -20$, and used in Equations 1 and 2 for obtaining values of the respective radii, the residual spherical aberration of the resulting system was found to be too great when used at N. A.=0.50. The system obtained gave the following values: $R_1 = -3.56879$ and $R_2 = -1.24192$, but the residual aberration was found to be strongly over-corrected. The introduction of a small amount of third-order spherical aberration of the correct sign into Equation 3 and solving for new values of $a_3$ may be used to give a better balance system. In the system of Fig. 4 where the 20X objective is to be used at N. A. 0.50 and with a cover plate 43 overlying the object and of a thickness of 0.18 mm., improved values were obtained for the radii $R_1$ and $R_2$ as follows:

$$R_1 = -3.37994$$
$$R_2 = -1.21823$$

and for a given object to image distance comparable to that used ordinarily for 20X microscope objectives, a working distance (object to center of curvature distance) of 8.70 mm. was taken and the following values for $R_1$ and $R_2$ obtained:

$$R_1 = -29.405 \text{ mm.}$$
$$R_2 = -10.599 \text{ mm.}$$

Figure 6:
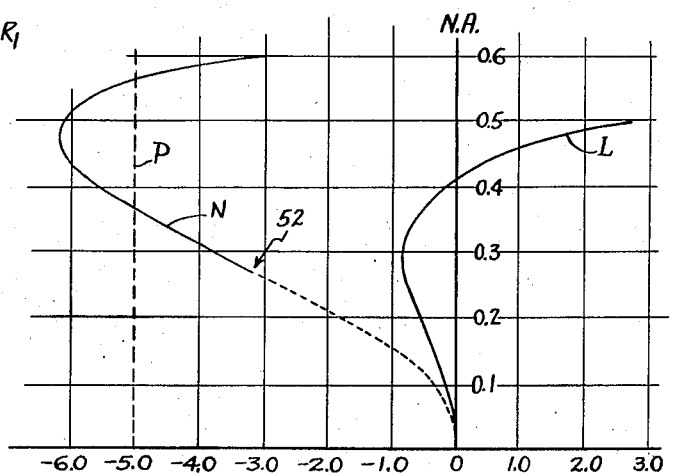
Fig. 6 is a longitudinal spherical aberration graph of the objective of Fig. 4 and showing curves therefor before and after certain adjustments have been made.

The spherical aberration curve for this 20X system is shown at L in Fig. 6 and indicates improved results allowing use of a N. A. of 0.50.

However, even better balancing of the residual spherical aberration may be obtained when desired. If reference is again made to Figs. 1 and 4 of the drawing, for example, it will be evident that the smaller mirror blocks out the central portion of the light rays emanating from the object and which would otherwise pass through the system and to the image plane. Consequently these rays serve no useful function in the system and it is reasonable to disregard them when attempting to obtain the best balance of spherical abberation in the objective for the rays which actually pass through the system. By repeating this process of introducing amounts of third-order spherical aberration for this 20X system using a 0.18 mm. cover plate and by testing the results by exact ray tracing it was found that an improved and satisfactory balance of the residual spherical aberration of the rays for an N. A. 0.60 objective could be obtained. Instead of $R_1 = -3.37994$ and $R_2 = -1.21823$ new values for the radii were obtained with $R_1 = -3.22482$ and $R_2 = -1.19747$.

Using these new values for $R_1$ and $R_2$ and a paraxial distance from the object point to the center of curvatures of 9.27 mm. another objective was constructed with $R_1 = -29.89$ mm. and $R_2 = -11.10$ mm. A spherical aberration curve N for the resulting N. A. 0.60 objective is also shown in Fig. 6. However, the central rays are blocked off by the small reflector and the dotted portion of the curve below the approximate cut off point 52 indicates the rays which are blocked. It is evident that this objective is strongly undercorrected with respect to the paraxial focus. Nevertheless since rays inwardly of the cut off point may be disregarded, it will be appreciated that a position of best focus will occur nearer the objective. Such a position is indicated at approximately −5.0 mm. by the dotted line P and at this focus this objective will be well balanced for spherical aberration.

In order to better understand the process of balancing the spherical aberration of the monocentric reflecting objectives of the invention reference is made to Fig. 7 wherein the line HK may represent a portion of the optical axis of a system and lines a, b, c, d and e represent rays originating at a single axial object point and thereafter proceeding through the reflecting system and from the last surface thereof as aberration afflicted rays. They would intersect the optical axis at spaced points and spaced from the paraxial focus of the system. Then a point I may be chosen either at or near the paraxial focus and for the purpose of this disclosure the point I will be considered as near this focus. A plane IJ perpendicular to the optical axis may then be passed through this point. If the ray bundles formed an aberration free image at I then all would intersect at this plane IJ at I. However, the several rays a, b, c, etc. are not free of spherical aberration and thus will intersect this plane at lateral distances or heights, $y_a$, $y_b$, etc. from the axial point I.

If the angle of inclination of a ray, such as ray a, to the optical axis be denoted by $\theta_a$ and the sign convention be such that this angle is negative, then $y_a$ may be considered to be a function of $\theta_a$ or more conveniently considered a function of sin $\theta_a$. When the inclination and intersection heights for a number of the rays have been determined their relative relations can be represented upon a lateral intersection graph such as shown in Fig. 8 wherein values of sin $\theta$ are represented in the horizontal direction and the heights $y$ in the vertical direction. When the lateral intersection graph has been figured and drawn, such as a curve Q, for one reference plane, it may be convenient to be able to deduce the intersection characteristics at another reference plane, such as I'J' without having to compute same. Since in Fig. 7 the point I is a point taken at a location other than the paraxial focus for the bundle the curve Q of Fig. 8 will be at an angle to the sin axis where it passes through the origin of the graph. If I had been chosen at the paraxial focus it will be apparent that the resulting curve would be tangent to the sin axis at the point I, such as suggested by the added curve Q'.

If the axial distance II' be represented by S and the intersection height on the new plane be $y_a'$, then we may state (with due regard for signs) that:

$$y_a' = y_a + S \tan \theta_a$$

and since the values of all ray angles to be so considered will be relatively small we may state with sufficient accuracy that for any of these rays $$y' = y + S \sin \theta \qquad \text{Eq. (5)}$$

If reference is again made to Fig. 8 which shows curve Q derived from the use of plane IJ of Fig. 7, we might let a straight line TR be the line whose equation is $$y = -S \sin \theta \qquad \text{Eq. (6)}$$

Then for any particular assumed value of sin $\theta$ such as at the one indicated by dotted line WVU the vertical distance from the line TR to the curve may be expressed:

$$WU = y' = y - (-S \sin \theta)$$

or $$y' = y + S \sin \theta$$

and is the approximation given in Equation 5. Hence when the intersection graph for one reference plane has been drawn, the intersection characteristics for any other plane can be readily determined.

It can be shown (see page 381, Mathematical Theory of Optics) that the optical path difference corresponding to two rays of inclination angles $\theta_1$ and $\theta_2$ may be represented as $$\int_{\theta_1}^{\theta_2} y \, d(\sin \theta)$$

It is evident in Fig. 8 that this integral represents the area under the intersection curve Q and between the points corresponding to sin $\theta_1$ and sin $\theta_2$. Therefore, by determining the area under the proper portion of the curve, the optical path difference corresponding to any two ray inclinations can be determined, and by similar procedure it is possible to determine path differences for points near the point for which the lateral intersection curve has been drawn. From the approximation $y' = y + S \sin \theta$ given by Equation 5 we may write the path difference as follows:

$$\int_{\theta_1}^{\theta_2} y' d(\sin \theta) = \int_{\theta_1}^{\theta_2} y \, d(\sin \theta) + \int_{\theta_1}^{\theta_2} S \, d(\sin \theta)$$

$$\int_{\theta_1}^{\theta_2} y' d(\sin \theta) = \int_{\theta_1}^{\theta_2} y \, d(\sin \theta) - S(\sin \theta_1 - \sin \theta_2)$$

Eq. (7)

The integral on the right side of the equation is represented by the area under the curve Q and within the points V'VWW' and the remaining term on the same side is represented by the area within the points V'VUU'. Hence the optical path differences at the nearby focus will be represented by the shaded area U'UWW'.

The process of evaluating the state of the correction of the spherical aberration with the above information may be carried out as follows. A lateral intersection graph is employed (see Fig. 9) and a curve for the particular objective design drawn thereon. (Usually for convenience, a transverse plane through the paraxial image point is taken to serve as this reference plane.) An inclined line corresponding to the best focus is found on the graph by determining which such line will leave the most nearly equal areas between the line and the curve from the origin outwardly to the left as far as the maximum sine value employed.

For example, the dotted line T'R' will leave a larger total upper area between the curve and the line (above the line) as compared to the lower area between the curve and the line (below the line). However, better results will be obtained by the use of the dotted line T"R" which will yield approximately equal upper and lower areas adjacent the line, and thus will represent substantially the best focus.

When, as in the case of the objectives under consideration, the central portion of the ray-bundle is blocked off by a reflector, we may indicate upon the graph the approximate point of cut-off, such as by dotted line sin $\theta_3$ in Fig. 9, and determine the best focus by rebalancing the upper and lower areas while disregarding the area between line sin $\theta_3$ and the origin of the graph. Such a readjustment is indicated by the line T'''R''', with the upper and lower shaded areas appearing substantially equal; and this will indicate the residual optical path difference existing in the system.

It will be evident that, in general, the larger the maximum value of sin $\theta$ in the rays which pass through a given objective, the larger will be the residual optical path difference. Consequently, if such residual optical path difference is to be limited to a specified amount, the greatest value of sin $\theta$ which the objective is to be allowed to pass must be correspondingly limited. It will also be evident that the greatest allowable value of sin $\theta$ will vary with the amount of third-order spherical aberration which the designer puts into the system. The process of design of a high aperture objective consists then of determining, usually by numerical approximation methods, the amount of third-order spherical aberration which will permit the use of the greatest value of sin $\theta$, subject to the chosen tolerance in optical path difference. It has been found in the present investigation that such high aperture objectives are obtained by the introduction of substantial amounts of third order aberration of the type commonly called "under-correction," with the best focus being as a result thereof, at an appreciable distance from the paraxial focus.

In evaluating the residual path difference of a particular optical design, it is of course necessary to express it in terms of phase aberration for the wave length of the light being used. The phase aberration equals the path aberration divided by the wave length. Consequently with a fixed amount of path aberration the phase aberration is greater for the shorter wave lengths than it is for the longer wave lengths. Fig. 10 shows, for illustration, a plot of phase aberration against wave length. Curve #1 corresponds to a path aberration of 295 millimicrons. At the wave length of yellow sodium light (589 millimicrons), shown by the dashed vertical line, this path aberration corresponds to a phase aberration of nearly 1.5 wave lengths. At 1000 millimicrons it corresponds to a phase aberration of only about 0.3 of a wave length. Curve #2 shows the relation for a path aberration of 147 millimicrons, and curve #3 the relation for 74 millimicrons. From curve #2, for example, we see that an objective which satisfies the ¼ λ Rayleigh criterion for yellow sodium light would not satisfy it for ultra-violet light at 250 millimicrons, but would much more than satisfy it at a wave length of 1000 millimicrons. From the foregoing it is evident, as indeed is well known, that an objective which satisfies a phase aberration criterion at one wave length may not satisfy it at a shorter wave length, and it may as a consequence be necessary to restrict the aperture of the objective if the criterion is to be satisfied at the shorter wave length.

Furthermore, it is well-known that if an objective design at one focal length be ratioed to another focal length by multiplying each linear dimension of the original design by the same constant factor, and if the objective so obtained be operated at the same magnification as the original, then the geometrical aberrations of the new objective, and hence the path aberration, equal those of the original objective multiplied by the ratioing factor. It follows that the phase aberration for light of a given wave length is also multiplied by the same factor. Hence a basic design which barely satisfies a given criterion when made up in one focal length will not satisfy it when made up at a longer focal length, but will more than satisfy it at a shorter focal length.

When dealing with a microscope objective design it is well to keep in mind that cover plates are often employed and when such is the case spherical aberration will be introduced into the system. For best results this aberration should be compensated for and this may be done, as previously, by the introduction of proper amounts of spherical aberration into Equation 3, solving for a new value of $a_3$ and then solving Equations 1 and 2 for values of R1 and R2, after which by exact ray tracing the system may be checked to determine the residual aberrations. Of course the thickness of the cover plate and its index of refraction should be taken into account, which for a standard cover plate are 0.18 mm. and 1.5244 respectively. If for example a 44x objective is being considered and the object-to-image distance is 183 mm. then 183÷45 or 4.07 mm. will equal the unit of measure of the system and the cover plate will be 0.18÷4.07 or 0.044 part of such a unit of measure. Then these values may be used in the ray tracing mentioned above for checking the resulting system.

Figure 5:
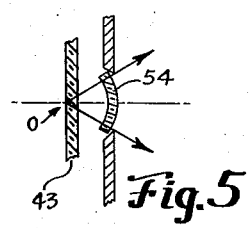
Fig. 5 shows part of an optical system similar to that in Fig. 4 except modified by a refracting element.

Furthermore, it should be noted that at times it might be desirable to correct the chromatic aberration of such a system using a cover plate and this may be done (see Fig. 5) by the use of a relatively thin or low power auxiliary lens component 84 located at the transverse plane of the center of curvature of the reflecting surfaces without materially disturbing the balanced condition of coma, astigmatism and distortion of the system.

In following the teachings of the invention, it has been found possible to obtain reflecting systems in the neighborhood of N. A. 0.60 while satisfying the ¼λ Rayleigh limit and in the neighborhood of N. A. 0.65 while keeping substantially within the Rayleigh limit of ½λ, and while in both cases obtaining satisfactory curvature of field. It should also be noted that in certain cases where even higher numerical apertures are sought after while maintaining the tolerance on correction of spherical aberration, a slight departure from a true monocentric condition (that is a slight axial spacing of the centers of curvatures) may be made and with only slight expense of introducing coma into the system.

I claim:

1. An image forming optical system comprising two optically aligned spherically curved reflecting surfaces having their respective centers of curvatures located substantially at a common axial point, the radii of said surfaces being so proportioned relative to each other as to provide at an image plane a predetermined axial distance from said common point an image of predetermined magnification, substantially free from coma, astigmatism and distortion, said reflecting surfaces having their radii $R_1$ and $R_2$ substantially equal to, respectively, $$\frac{2}{\alpha_3+1} \text{ and } \frac{2M}{1+M\alpha_3}$$

when the equation $$\frac{M-1}{8M^3}[M^2\alpha_3^2 + M(M+1)\alpha_3 - (M^2+M+1)] = 0$$

is satisfied and M is the predetermined magnification the system is to provide, and $\alpha_3$ is approximately equal to the numerical value of the angle which any chosen image-forming ray between the two reflecting surfaces makes up the optical axis of the system, whereby the system will be well corrected for residual spherical aberration.

2. An image-forming optical system having a relatively high numerical aperture and arranged to provide an image of predetermined magnification substantially free from coma, astigmatism and distortion and well corrected for spherical aberration at a numerical aperture of 0.60, said system comprising two spherically curved reflecting surfaces axially spaced along a common optical axis and having their respective centers of curvature located substantially at a single axial point thereon, one of said reflecting surfaces being a concave reflecting surface having a radius $R_1$ substantially equal to $$\frac{2}{\alpha_3+1}$$

and the other a convex reflecting surface having a radius $R_2$ substantially equal to $$\frac{2M}{1+M\alpha_3}$$

wherein M is said predetermined magnification and $\alpha_3$ is approximately equal to the numerical value of the angle which any chosen image-forming ray between said reflecting surfaces makes with the optical axis of the system, said concave reflecting surface facing a predetermined first conjugate plane of said system a finite axial distance from said single axial point so as to reflect light rays when emanating from an object at said first conjugate plane toward said convex reflecting surface, said convex reflecting surface being disposed between said first conjugate plane and said concave surface and facing said concave reflecting surface so as to receive said reflected light rays and direct same toward a second conjugate plane of said system a different finite axial distance in the opposite direction from said single axial point, said concave surface having a light aperture adjacent said optical axis for allowing the light rays when reflected from said convex surface to reach said second plane, an aperture stop located substantially at the transverse plane containing said centers of curvature and of such size as to provide said high numerical aperture, said convex reflecting surface and the aperture in said concave surface being of such related transverse dimensions as to prevent light from an object at said first conjugate plane from passing directly through said system to said second conjugate plane, said reflecting surfaces having their respective radii of such different predetermined dimensions relative to each other while their respective centers of curvature remain substantially at said single point that a marginal image-forming ray passing through said system compared to a paraxial ray will provide appreciable third-order spherical aberration of the undercorrected type while the phase aberration in the image-forming rays will not exceed ½ wavelength.

3. An image-forming optical system having a relatively high numerical aperture and arranged to provide an image of predetermined magnification substantially free from coma, astigmatism and distortion and well corrected for spherical aberration at a numerical aperture of 0.60, said system comprising two spherically curved reflecting surfaces axially spaced along a common optical axis and having their respective centers of curvature located substantially at a single axial point thereon, one of said reflecting surfaces being a concave reflecting surface having a radius $R_1$ substantially equal to $$\frac{2}{\alpha_3+1}$$

and the other a convex reflecting surface having a radius $R_2$ substantially equal to $$\frac{2M}{1+M\alpha_3}$$

wherein M is said predetermined magnification and $\alpha_3$ is approximately equal to the numerical value of the angle which any chosen image-forming ray between said reflecting surfaces makes with the optical axis of the system, said concave reflecting surface facing a predetermined first conjugate plane of said system a finite axial distance from said single axial point so as to reflect light rays when emanating from an object at said first conjugate plane toward said convex reflecting surface, said convex reflecting surface being disposed between said first conjugate plane and said concave surface and facing said concave reflecting surface so as to receive said reflected light rays and direct same toward a second conjugate plane of said system a different finite axial distance in the opposite direction from said single axial point, said concave surface having a light aperture adjacent said optical axis for allowing the light rays when reflected from said convex surface to reach said second plane, an aperture step located substantially at the transverse plane containing said centers of curvature and of such size as to provide said high numerical aperture, said convex reflecting surface and the aperture in said concave surface being of such related transverse dimensions as to prevent light from an object at said first conjugate plane from passing directly through said system to said second conjugate plane, said reflecting surfaces having their respective radii of such different predetermined dimensions relative to each other while their respective centers of curvature remain substantially at said single point that a marginal image-forming ray passing through said system compared to a paraxial ray will provide appreciable third-order spherical aberration of the undercorrected type while the phase aberration in the image-forming rays will not exceed ½ wavelength, and a relatively low power spherically curved refracting element of predetermined refractive and dispersive properties in optical alignment in said system and located substantially at the transverse plane containing said aperture stop.

4. A reflecting type image-forming optical system having a relative high numerical aperture in the neighborhood of at least 0.50, said system providing substantially a predetermined magnification at an image plane a predetermined finite distance from an object plane conjugate thereto, said system being substantially free from coma, stigmatism and distortion and so well balanced for residual spherical aberration that the phase aberration at said image plane will be no more than one-fourth wave length for the sodium D line of the spectrum, said system comprising two optically aligned spherically curved reflecting surfaces having their respective centers of curvature located substantially at a common axial point, one of said surfaces being convex and the other concave, said concave surface having a central aperture formed therein and being so disposed in said system as to receive light rays from said object plane and direct same toward said convex surface, said convex surface being so disposed as to direct said light rays through said aperture and toward said image plane, the radii of said surfaces being so proportioned relative to each other as to be substantially equal to, respectively, $$\frac{2}{\alpha_3+1} \text{ and } \frac{2M}{1+M\alpha_3}$$

when the third-order spherical aberration equation $$\frac{M-1}{8M^3}\cdot[M^2\alpha_3^2+M(M+1)\alpha_3-(M^2+M+1)]$$

is substantially equal to zero and wherein in said equation $\alpha_3$ is the angle which any chosen image-forming ray between the two reflecting surfaces makes with the optical axis of said system and wherein M is the predetermined magnification of said system, whereby a system well corrected for residual spherical aberration will be provided.

5. A reflecting type image-forming optical system having a relative high numerical aperture in the neighborhood of at least 0.50 or more, said system providing substantially a 20X magnification at an image plane a predetermined finite distance from an object plane conjugate thereto, said system being substantially free from coma, stigmatism and distortion and so well balanced for residual spherical aberration that the phase aberration at said image plane will be no more than one-fourth wave length for the sodium D line of the spectrum, said system comprising two optically aligned spherically curved reflecting surfaces having their respective centers of curvature located substantially at a common axial point, one of said surfaces being convex and the other concave, said concave surface having a central aperture formed therein and being so disposed in said system as to receive light rays from said object plane and direct same toward said convex surface, said convex surface being so disposed as to direct said light rays through said aperture and toward said image plane, the radii $R_1$ and $R_2$ of said concave and convex surfaces being so proportioned relative to each other as to be substantially equal to, respectively, 3.37994 F and 1.21823 F and wherein F is approximately equal to the axial distance between said common point and said object plane.

6. A reflecting type image-forming optical system having a relative high numerical aperture in the neighborhood of at least 0.50 or more, said system providing substantially a 20X magnification at an image plane a predetermined finite distance from an object plane conjugate thereto, said system being substantially free from coma, stigmatism and distortion and so well balanced for residual spherical aberration that the phase aberration at said image plane will be no more than one-fourth wave length for the sodium D line of the spectrum, said system comprising two optically aligned spherically curved reflecting surfaces having their respective centers of curvature located substantially at a common axial point, one of said surfaces being convex and the other concave, said concave surface having a central aperture formed therein and being so disposed in said system as to receive light rays from said object plane and direct same toward said convex surface, said convex surface being so disposed as to direct said light rays through said aperture and toward said image plane, the radii $R_1$ and $R_2$ of said concave and convex surfaces being so proportioned relative to each other as to be substantially equal to, respectively, 3.22482 F and 1.19747 F and wherein F is approximately equal to the axial distance between said common point and said object plane.

ARTHUR J. KAVANAGH.

References Cited in the file of this patent

UNITED STATES PATENTS

| Number | Name | Date |
|---|---|---|
| 1,967,214 | Acht | July 24, 1934 |
| 2,198,014 | Ott | Apr. 23, 1940 |
| 2,380,887 | Warmisham | July 31, 1945 |

FOREIGN PATENTS

| Number | Country | Date |
|---|---|---|
| 410,263 | France | Mar. 10, 1910 |
| 538,622 | Great Britain | Aug. 11, 1941 |
| 61,355 | Denmark | Sept. 27, 1943 |